United States Patent
Xu et al.

(10) Patent No.: US 11,096,232 B2
(45) Date of Patent: Aug. 17, 2021

(54) ENHANCEMENTS TO CONNECTION REJECTION PROCEDURES

(71) Applicant: Apple Inc., Cupertino, CA (US)

(72) Inventors: Fangli Xu, Beijing (CN); Rohit R. Matolia, Surat (IN); Vijay Venkataraman, Sunnyvale, CA (US); Dawei Zhang, Saratoga, CA (US); Haijing Hu, Beijing (CN); Yuqin Chen, Shenzhen (CN); Sethuraman Gurumoorthy, San Jose, CA (US); Srirang A. Lovlekar, Cupertino, CA (US); Murtaza A. Shikari, Mountain View, CA (US); Sree Ram Kodali, Sunnyvale, CA (US); Srinivasan Nimmala, San Jose, CA (US); Xu Ou, San Jose, CA (US); Longda Xing, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/553,427

(22) Filed: Aug. 28, 2019

(65) Prior Publication Data
US 2020/0084818 A1   Mar. 12, 2020

Related U.S. Application Data

(60) Provisional application No. 62/728,318, filed on Sep. 7, 2018.

(51) Int. Cl.
*H04W 36/00* (2009.01)
*H04W 76/18* (2018.01)
(Continued)

(52) U.S. Cl.
CPC ....... *H04W 76/18* (2018.02); *H04W 36/0079* (2018.08); *H04W 48/02* (2013.01); *H04W 48/04* (2013.01); *H04W 84/042* (2013.01)

(58) Field of Classification Search
CPC ....... H04W 4/14; H04W 36/04; H04W 36/18; H04W 36/30; H04W 36/32; H04W 48/18; H04W 60/00
(Continued)

(56) References Cited

U.S. PATENT DOCUMENTS 7,949,377 B2   5/2011   Islam et al.
8,718,644 B2   5/2014   Thomas et al.
(Continued)

FOREIGN PATENT DOCUMENTS

CN   101848520 A   9/2010
EP   2801229 B1    4/2019
(Continued)

OTHER PUBLICATIONS

Office Action, German Application No. DE 10 2016 207 027.4, dated Jan. 16, 2018, 6 pages.
(Continued)

*Primary Examiner* — Matthew W Genack
(74) *Attorney, Agent, or Firm* — Kowert, Hood, Munyon, Rankin & Goetzel, P.C.

(57) ABSTRACT

This disclosure relates to techniques for efficiently handling connection rejections. A wireless device may detect barring conditions in response to receiving one or more connection rejections. The wireless device may bar one or more connections based on the barring conditions, and may attempt to access network services over one or more other connections.

20 Claims, 8 Drawing Sheets

(51) Int. Cl.
  *H04W 48/02* (2009.01)
  *H04W 48/04* (2009.01)
  *H04W 84/04* (2009.01)

(58) Field of Classification Search
  USPC .................. 455/435.1–435.3, 436–444, 466
  See application file for complete search history.

(56) References Cited

U.S. PATENT DOCUMENTS

| | | |
|---|---|---|
| 9,210,627 B1 | 12/2015 | Rao |
| 9,414,298 B1 | 8/2016 | Pasupuleti |
| 9,485,697 B1* | 11/2016 | Wang .................... H04W 36/22 |
| 9,485,710 B2 | 11/2016 | Jung |
| 9,510,230 B2 | 11/2016 | Jeong |
| 10,251,118 B2 | 4/2019 | Ahmad |
| 2006/0039309 A1 | 2/2006 | Lee et al. |
| 2006/0189318 A1 | 8/2006 | Kang |
| 2007/0207815 A1* | 9/2007 | Alfano .................. H04W 48/04 |
| | | 455/456.1 |
| 2008/0200146 A1* | 8/2008 | Wang .................. H04J 11/0069 |
| | | 455/410 |
| 2008/0214249 A1 | 9/2008 | Kim |
| 2009/0180414 A1 | 7/2009 | Maeda |
| 2011/0151943 A1 | 6/2011 | Lee |
| 2012/0289230 A1 | 11/2012 | Uno et al. |
| 2013/0094364 A1 | 4/2013 | Bjorkengren et al. |
| 2013/0107778 A1 | 5/2013 | Ryu |
| 2013/0159497 A1* | 6/2013 | Butler ................. G06F 21/6218 |
| | | 709/224 |
| 2013/0210420 A1 | 8/2013 | Deivasigamani |
| 2013/0272139 A1 | 10/2013 | Guo |
| 2014/0045509 A1 | 2/2014 | Parr |
| 2014/0050170 A1 | 2/2014 | Xu et al. |
| 2014/0148169 A1 | 5/2014 | Li |
| 2014/0194086 A1 | 7/2014 | Alam et al. |
| 2014/0274095 A1 | 9/2014 | Saito |
| 2014/0295851 A1 | 10/2014 | Kubota |
| 2014/0307720 A1* | 10/2014 | Koslela ................ H04W 48/02 |
| | | 370/336 |
| 2014/0333145 A1 | 11/2014 | Lee et al. |
| 2014/0344599 A1 | 11/2014 | Branover |
| 2014/0355417 A1* | 12/2014 | Kim .................... H04L 41/0654 |
| | | 370/221 |
| 2015/0071064 A1 | 3/2015 | Geng |
| 2015/0105062 A1 | 4/2015 | Quan |
| 2015/0109918 A1 | 4/2015 | Sharma et al. |
| 2015/0208300 A1* | 7/2015 | Mclaughlin ....... H04W 36/0083 |
| | | 455/436 |
| 2016/0007176 A1* | 1/2016 | Moisanen ............... H04W 4/90 |
| | | 455/404.1 |
| 2016/0014681 A1* | 1/2016 | Yi ........................ H04W 48/16 |
| | | 455/422.1 |
| 2016/0255674 A1* | 9/2016 | Niemi .................. H04W 76/18 |
| | | 455/435.1 |
| 2017/0223584 A1* | 8/2017 | Deng .................... H04W 48/08 |
| 2018/0035292 A1* | 2/2018 | Soundararajan ...... H04W 12/06 |
| 2018/0184299 A1* | 6/2018 | Van Hamersveld .. H04L 63/101 |
| 2018/0324675 A1 | 11/2018 | Lee |
| 2019/0082376 A1 | 3/2019 | Hong |
| 2019/0166646 A1* | 5/2019 | Shih .................... H04W 76/19 |

FOREIGN PATENT DOCUMENTS

| | | |
|---|---|---|
| WO | WO20100137831 A2 | 12/2010 |
| WO | WO2011093982 A1 | 8/2011 |
| WO | WO20110157224 A1 | 12/2011 |
| WO | WO 2013/025142 A1 | 2/2013 |
| WO | WO2014039853 A1 | 3/2014 |
| WO | WO 2019/032798 A1 | 2/2019 |

OTHER PUBLICATIONS

First Office Action, Chinese Application No. 201610321424.7, dated Feb. 2, 2019, 11 pages.

* cited by examiner

ENHANCEMENTS TO CONNECTION REJECTION PROCEDURES

PRIORITY CLAIM

This application claims priority to U.S. provisional patent application Ser. No. 62/728,318, entitled "Enhancement to Connection Rejection Procedures," filed Sep. 7, 2018, which is hereby incorporated by reference in its entirety as though fully and completely set forth herein.

FIELD

The present application relates to wireless devices, including to apparatuses, systems and methods for efficiently handling connection rejections.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), 5G NR, HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

As wireless communication technologies and wireless devices implementing those technologies are developed and updated over time, there can be potential for new or updated features, configurations, software, etc., that further increase demands on network devices such as base stations. Further, various circumstances may lead to multiple rejections of connection requests, e.g., radio resource control (RRC) rejections. Multiple connection rejections may harm the user experience. Accordingly, improvements in the field are desired.

SUMMARY

Embodiments are presented herein of apparatuses, systems, and methods to implement enhanced handling of connection rejections, and thus realize better wireless service. A wireless device may send one or more requests to connect to a network and may receive one or more connection rejections. The wireless device may detect barring conditions based on the one or more connection rejections and may implement barring. To implement barring, the device may do one or more of: randomizing a barring timer, barring one or more connections, using a barring priority order, and/or reporting to a network.

The techniques described herein may be implemented in and/or used with a number of different types of devices, including but not limited to cellular phones, cellular base stations, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
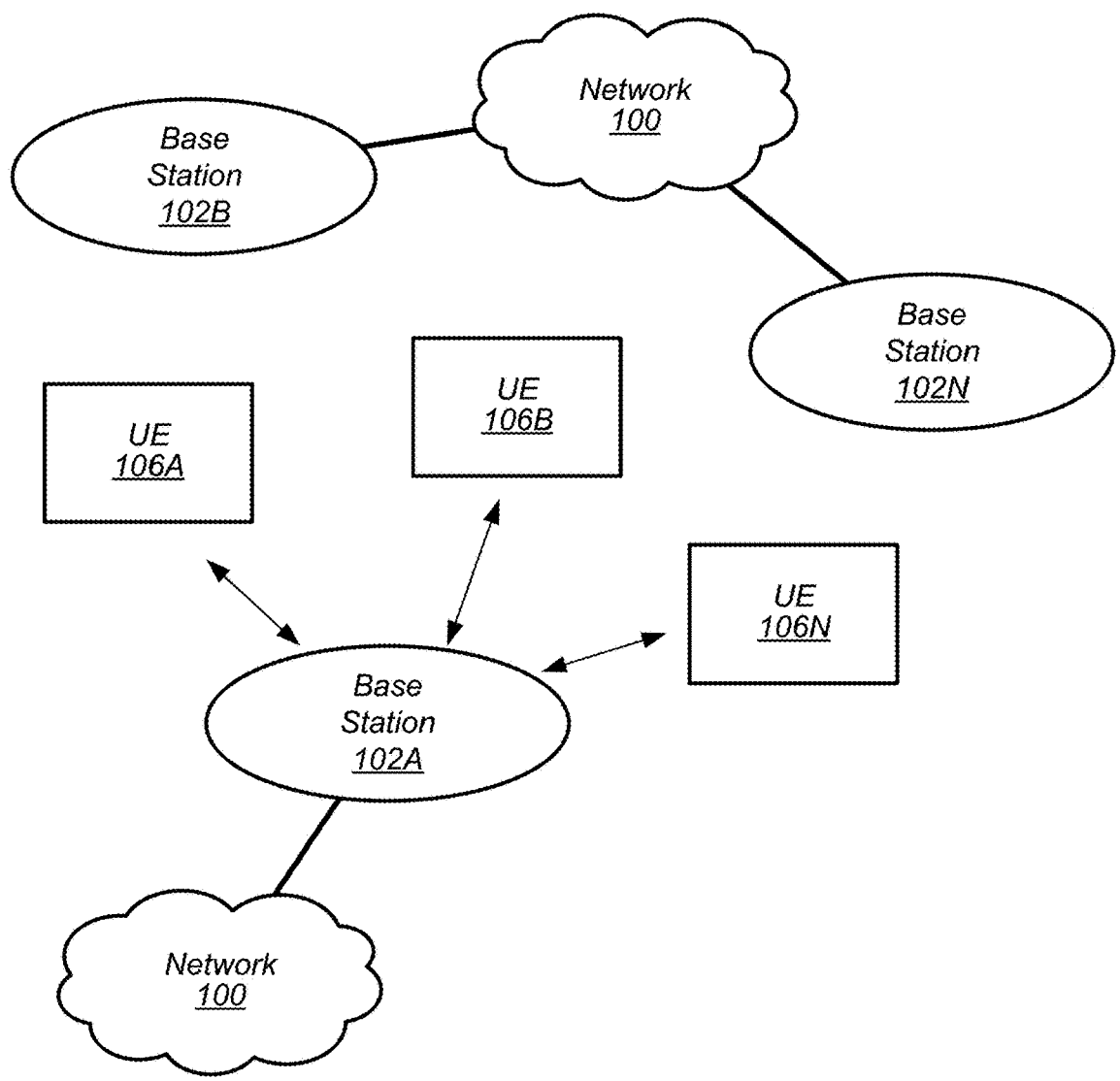
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
RAN: Radio Access Network
GSM: Global System for Mobile Communications
GERAN: GSM EDGE Radio Access Network
UMTS: Universal Mobile Telecommunications System
UTRAN: UMTS Terrestrial Radio Access Network or Universal Terrestrial Radio Access Network
UE: User Equipment
LTE: Long Term Evolution
NR: New Radio
E-UTRAN: Evolved UMTS Radio Access Network or Evolved Universal Radio Access Network
RRC: Radio Resource Control
NW: Network
BS: base station
MME: Mobility Management Entity
AC: access class
DOS: denial of service
AS: access stratum
NAS: non-access stratum
SW: software
RAT: radio access technology
PLMN: public land mobile network Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™ Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
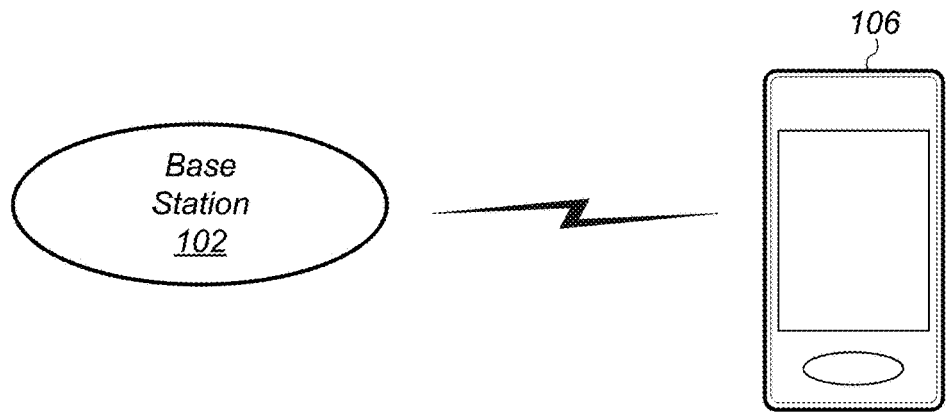
FIG. 2 illustrates a base station (BS) in communication with a user equipment (UE) device, according to some embodiments.

FIGS. 1-2—Communication System

FIG. 1 illustrates an exemplary (and simplified) wireless communication system in which aspects of this disclosure may be implemented, according to some embodiments. For example, any or all of the wireless devices illustrated in FIG. 1 may be configured for handling connection rejections as described herein, e.g., according to one or more of the methods of FIGS. 5-7. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware and/or software that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication among the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), NR, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, UMTS, LTE, LTE-A, NR, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
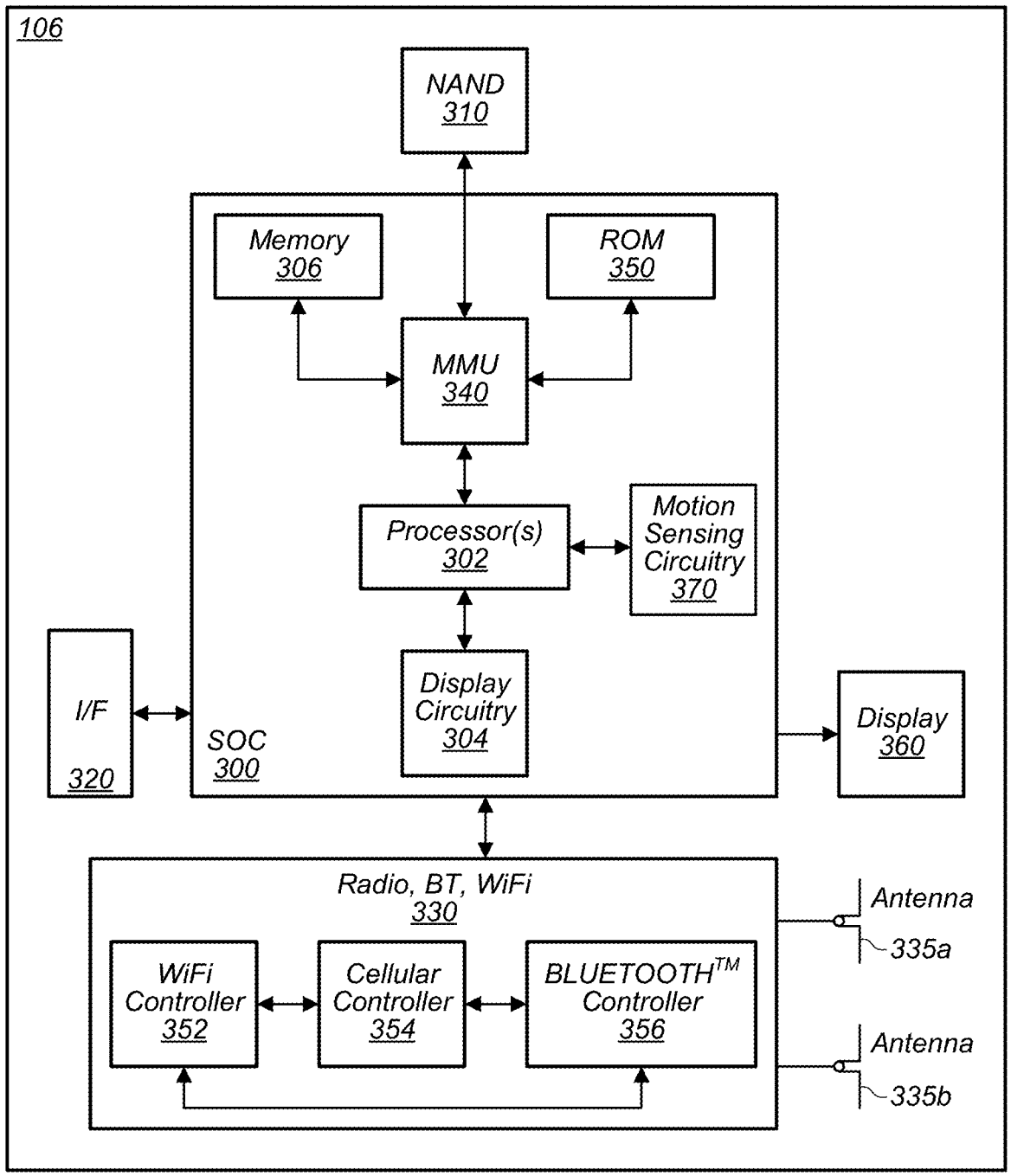
FIG. 3 illustrates an exemplary block diagram of a UE, according to some embodiments.

FIG. 3—Block Diagram of a UE Device

FIG. 3 illustrates one possible block diagram of a UE device 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106 may include at least one antenna, and in some embodiments multiple antennas 335*a* and 335*b* (and/or further additional antennas), for performing wireless communication with base stations and/or other devices. For example, the UE device 106 may use antennas 335*a* and 335*b* to perform the wireless communication. As noted above, the UE device 106 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106 to perform Wi-Fi communications on an 802.11 network. The Bluetooth Logic 336 is for enabling the UE device 106 to perform Bluetooth communications. The cellular modem 334 may be a lower power cellular modem capable of performing cellular communication according to one or more cellular communication technologies (e.g., LTE, 5G NR, GSM, etc.).

As described herein, UE 106 may include hardware and software components for implementing embodiments of this disclosure. For example, one or more components of the wireless communication circuitry 330 (e.g., cellular modem 334) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
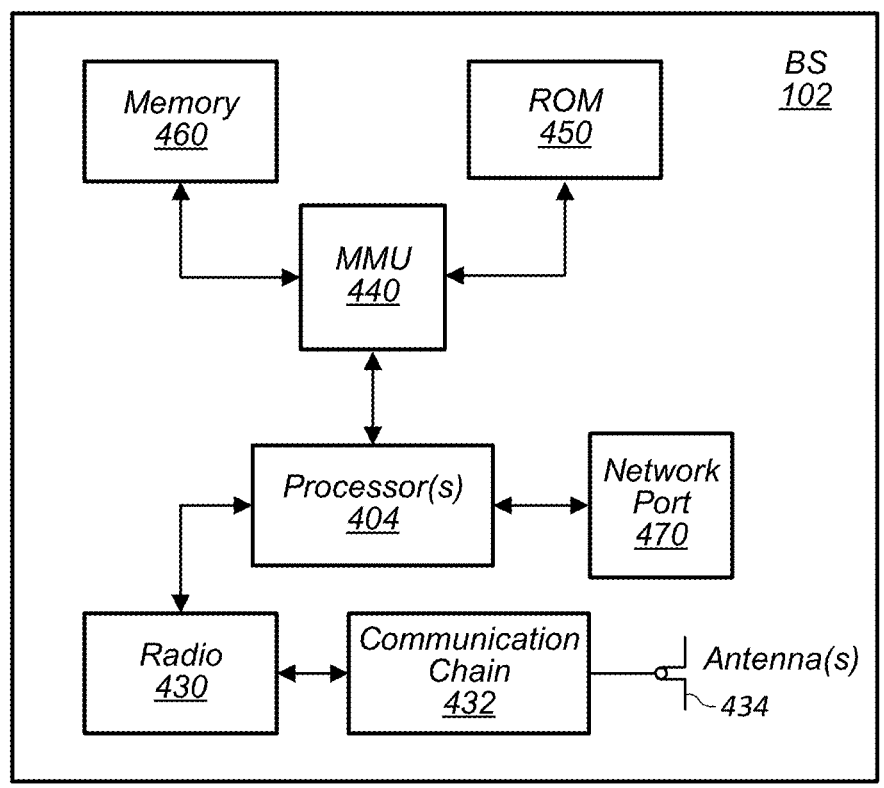
FIG. 4 illustrates an exemplary block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430 (or multiple radios 430). The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, LTE and 5G NR, UMTS and GSM, etc.). The BS 102 may provide one or more cells of one or more communication technologies and/or one or more public land mobile networks (PLMNs).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
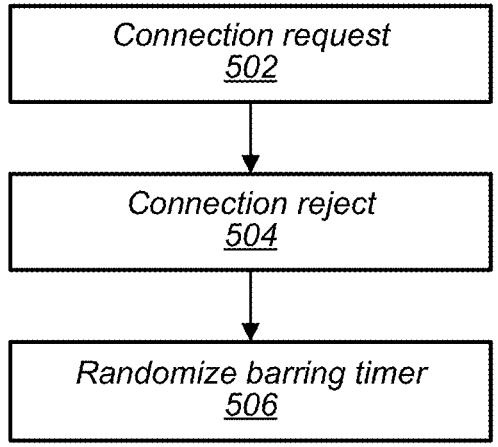
FIGS. 5-7 are flow chart diagrams illustrating exemplary methods for efficiently handling connection rejections, according to some embodiments.
Figure 7:
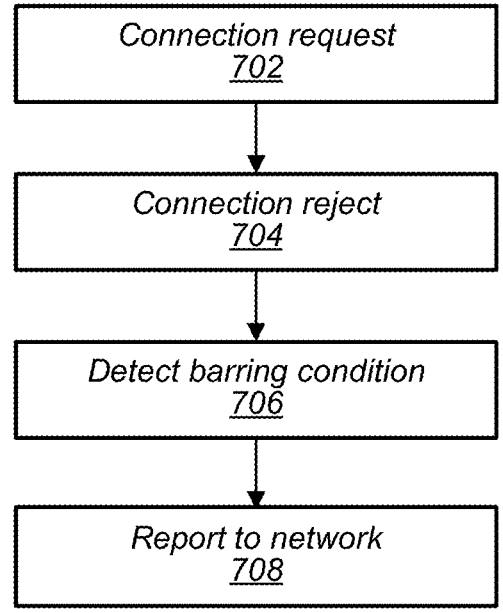
Figure 6:
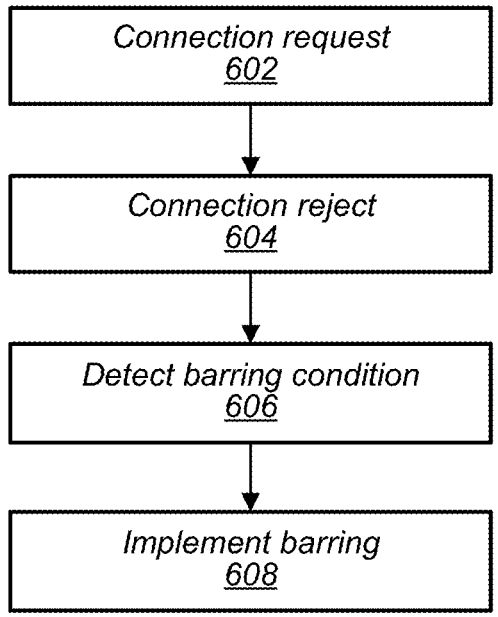

FIGS. 5-7—Enhancements to Connection Rejection Procedures

Radio access control (access barring control) may be an element of traffic congestion control. A network (e.g., network 100), a base station (e.g., BS 102), or a user equipment (e.g., UE 106) may determine to temporarily bar (e.g., prevent) a UE from accessing at least some network services under some conditions. Among various possibilities, the determination of whether to bar a UE may be based on network conditions and/or the service(s) requested by the UE. For example, an emergency call may be permitted (e.g., not barred) at a time when a non-emergency call or connection request for data traffic may be denied (e.g., barred) due to congestion. Example services include voice calls, application data transfers and other interne data services, and any carrier provided value added services.

In some embodiments, access barring control may be based on an access class (AC) control method, which may be controlled at least in part by the UE. Prior to sending a connection request to a BS, a UE may identify an AC (e.g., a service type or call type) associated with the connection request. Based on the service type, the UE may determine whether the connection request should be barred. The UE may base this determination at least in part on AC restriction information provided by the network. For example, a BS may broadcast AC restriction information in one or more messages such as system information block (SIB) 1 messages. The AC restriction information may also include other parameters, such as information related to the duration of access barring, e.g., an access barring timer such as T302 in LTE. The AC restriction information may be updated based on changing conditions including congestion at the BS or other network elements. If the UE determines that the request should be barred (e.g., based on the AC restriction information and AC of the connection request), the UE may not transmit another connection request for a period of time (e.g., based on an access barring timer). Alternatively, if the UE determines that the request should not be barred, it may send a connection request (e.g., RRC connection request) to the BS.

In some embodiments, access barring control may be based on a connection rejection method. Such a connection rejection method may be implemented by many commercial networks and network operators. Moreover, some network operators may rely exclusively on such methods for access control. According to a connection rejection method, a UE may send a connection request (e.g., RRC connection request) to a BS. The BS and/or network (NW) may determine whether or not to reject the request. The B S/NW may consider the service type (e.g., establishment cause) of the connection request in making the determination, as well as congestion and other factors. If the request is to be rejected, the BS may send a rejection (e.g., RRC connection reject or RRC connection rejection) message to the UE. The rejection message may include a wait time (e.g., timer T302). The duration of the wait time may range from 1-1,800 seconds (e.g., a BS may include the extendedWaitTime-r10 information element (IE) in the RRC Connection Reject message which may go up to 1,800 seconds), among various possibilities (e.g., the time may be less than 1 second or more than 1,800 seconds or any intermediate value). If the request is to be accepted, the BS may send a setup (e.g., RRC connection setup) message to the UE and the UE may enter a connected state (e.g., RRC connected).

Upon receiving a rejection message, a UE may wait, e.g., for a prescribed wait time. The UE may not access the NW and may not be reachable (e.g., by or via the NW) during this time. Thus, the user of the UE may experience limited service; e.g., the UE may not provide a service requested by the user or an application executing on the UE. An access stratum (AS) layer of the UE may bar the cell (e.g., among various possibilities) for the period of the wait timer, and may not perform cell-reselection to regain service (e.g., unless the cell's radio quality is changed) during that time. A non-AS (NAS) layer may not initiate another access attempt (e.g., connection request or other action to regain service) prior to receiving an indication that the barring condition is alleviated. Thus, in some embodiments, the AS and NAS layers may not trigger a serving cell change (or other form of reselection to regain service, e.g., to a different tracking area, RAT, or NW) during the wait time unless conditions change or the UE is moving (e.g., which may result in a change in measured conditions).

In some embodiments and under some conditions, e.g., during times of congestion for a BS or other NW elements, a UE may repeatedly request a connection, wait for the prescribed time (e.g., using a timer such as T302) and be rejected. This iteration of multiple rejections and associated wait times may result in the UE being in limited service for the duration of the iteration (e.g., of multiple, successive wait times), and may thus lead to a poor user experience. In other words, in congested areas/times, users may not be able to access NW services for a long period of time, e.g., due to the repeated connection rejections.

Moreover, it may be possible that in some cases, large groups of UEs may (e.g., by random chance or coincidence, or as a result of some event, e.g., on the network) send connection requests at approximately the same time, and the NW may not be able to handle the large number of requests in a small time period, and may thus trigger rejections. Such a group of UEs making requests and receiving rejections together (e.g., even though without coordination) may effectively be synchronized due to the repeating pattern of the same wait time.

Times of high load (e.g., congestion) on one or more BSs or other NW elements may lead to significant rates of connection rejections, and may thus lead to poor user experience for many users. For example, sporting events and traffic jams may lead to congestion and associated rejections. For example, during some recent major sporting events, some networks have experienced increases in access rejection rates of more than 80%. Moreover, in some major cities, rejection rates may reach 80% during peak commute/traffic hours. Note that these rejection rates are exemplary only, and that other values are possible. Such rejection rates may lead to poor user experience for the users of devices receiving the rejections.

A further challenge associated with access barring control based on a connection rejection method may be susceptibility to denial of service (DOS) attacks. For example, a fake BS may (e.g., maliciously) send false RRC connection reject messages, utilizing a wait timer with a long value. In this manner, the fake BS may be able to deny one or more UEs from normal service. Note that, in some embodiments, an RRC rejection message may be sent as a plain text message.

FIG. 5 is a flowchart diagram illustrating one possible embodiment of a scheme to enhance handling of connection rejections. According to some embodiments, use of the scheme depicted in FIG. 5 may result in improvements to the user experience and reduced susceptibility to DOS attacks, among other potential benefits. Aspects of the method of FIG. 5 may be implemented by a wireless device such as a UE 106 in communication with a BS 102 illustrated in various of the Figures herein, or more generally in conjunction with any of the computer systems or devices shown in the above Figures, among other devices, as desired. For example, one or more processors such as 302, a processor included in circuitry 330, 404, etc. may cause a UE 106 and/or BS 102 to implement any or all of the method elements of FIG. 5.

In various embodiments, some of the elements of the method shown may be performed concurrently, in a different order than shown, may be substituted for by other method elements, or may be omitted. Additional elements may also be performed as desired. As shown, the method may operate as follows.

The wireless device (e.g., UE 106) may send a connection request to a BS, e.g., BS 102 (502). The connection request may be or include an RRC connection request, e.g., according to LTE. The connection request may be a connection request to access one or more networks of any RAT(s), e.g., LTE, LTE-A, 5G NR, UMTS, or CDMA among various possibilities.

The connection request may include various types of information. For example, the connection request may include information on one or more services that the UE 106 requests to access via the network. The service type information may be included in an establishment clause, or other field of the connection request. For example, the UE 106 may determine to provide and/or access a first service and the service type information may identify the first service, identify a category of the first service, and/or identify one or more characteristics of the first service. In some embodiments, the connection request may include additional information, e.g., such as measurement reports, e.g., which may be unrelated to the first service.

Upon sending the connection request, the UE 106 may start a timer (e.g., T300) associated with the connection request. The connection request may be received by a BS 102.

The network (e.g., via a BS 102) may send a connection rejection message to the UE 106 (504). The connection rejection message may be or include an RRC connection reject. The connection rejection may be based on service type information from the connection request, the level of congestion (load) at the BS or any other NW element(s), and/or other factors.

The connection rejection message may include barring parameters. For example, the message may specify the duration of a waiting (barring) period, e.g., the length of time that the UE should wait before sending another connection request message. This length of time may be associated with a barring timer, e.g., a wait timer, e.g., T302. The message may further specify whether the UE should bar or de-prioritize one or more of: the serving cell, another cell or cells, one or more tracking areas (e.g., a current tracking area and/or other tracking areas), one or more RATs (e.g., a current RAT and/or other RATs), and/or one or more PLMNs (e.g., a current PLMN and/or other PLMNs).

In some embodiments, the barring timer may specify a length of time that the UE should wait before sending another connection request message to the current serving cell. In some embodiments, the UE may not reselect to a different cell (e.g., or a different connection) during the length of time. In other words, following expiration of the timer, the UE may send another connection request message to the current serving cell or to a different cell or other different connection.

In some embodiments, the barring timer may specify a length of time that the UE should wait before sending another connection request message to the current serving cell, however the UE may initiate another connection (e.g., with another cell, RAT, network, tracking area, etc.) during this length of time.

In some embodiments, multiple barring timers may be used concurrently, e.g., to bar different types of connection requests. For example, a first timer may be used to bar all connection requests and a second to bar only some connection requests (e.g., to the current serving cell), among various possibilities.

The connection rejection message may be received by the UE 106. In response to receiving the connection rejection message, the UE 106 may start the wait timer (e.g., T302) and/or stop the timer associated with the connection request (e.g., T300). A lower layer (e.g., the RRC layer) of the UE 106 may inform one or more upper layers (e.g., NAS layer and/or an application layer) of the UE 106 that access is barred for the duration of the wait timer. The UE 106 may further reset a MAC layer and release the MAC configuration.

The UE 106 may randomize a barring timer, e.g., a wait timer (506). In other words, the UE 106 may set the timer using a random value uniformly distributed between 0 (e.g., or any configured minimum value) and the configured timer value (e.g., as indicated by the rejection message). For example, the UE may use a random timer value instead of a particular timer value (e.g., T302) indicated by the network. For example, the network may indicate to the UE to use a random value and the UE may determine to use a random value in response to such an indication. In some embodiments, a configured maximum value may be used instead of the configured timer value. The configured maximum value may be different for different services. In other words, the configured maximum value may be based on access class and/or one or more characteristics of one or more foreground or background applications. For example, a voice call may have a lower configured maximum value than a data transfer. In some embodiments, the UE may (e.g., automatically or independently) determine to use a random value, e.g., without an indication from the network associated with the connection rejection.

The UE 106 may wait until the timer expires and may then send another connection request.

The scheme illustrated in FIG. 5 may serve to un-synchronize a group of UEs that would otherwise repeatedly request connections at approximately the same time, thus overloading the BS 102 and/or other NW elements and triggering rejections. By randomly redistributing these connection requests in time, the NW/BS may be able to serve (e.g., accept) a higher portion of the requests. In other words, spreading the requests out (e.g., potentially more evenly in order to reduce or avoid cyclical patterns of groups of UEs requesting access at approximately the same time) may allow the NW/BS to reject fewer requests, thus partially relieving some symptoms of congestion.

FIG. 6 is a flowchart diagram illustrating another possible embodiment of a scheme to enhance handling of connection rejections. According to some embodiments, use of the scheme depicted in FIG. 6 may result in improvements to the user experience and reduced susceptibility to DOS attacks, among other potential benefits. Aspects of the method of FIG. 6 may be implemented by a wireless device such as a UE 106 in communication with a BS 102 illustrated in various of the Figures herein, or more generally in conjunction with any of the computer systems or devices shown in the above Figures, among other devices, as desired. For example, one or more processors such as 302, a processor included in circuitry 330, 404, etc. may cause a UE 106 and/or BS 102 to implement any or all of the method elements of FIG. 6.

In various embodiments, some of the elements of the method shown may be performed concurrently, in a different order than shown, may be substituted for by other method elements, or may be omitted. Additional elements may also be performed as desired. As shown, the method may operate as follows.

The wireless device (e.g., UE 106) may send a connection request to a BS, e.g., BS 102 (602), and the network (e.g., via a BS 102) may send a connection rejection message to the UE 106 (604), e.g., similar to blocks 502 and 504 of FIG. 5. Thus, blocks 602 and 604 of FIG. 6 may include similar features and functionality as previously described herein with respect to blocks 502 and 504 of FIG. 5, at least according to some embodiments.

The UE 106 may detect one or more indications of barring conditions (606). Barring conditions may indicate that changing from one connection (e.g., the connection or connection type associated with the connection rejection message) to another connection or connection type may be advantageous. For example, by attempting to access services via a different connection, the UE 106 may be able to bypass the congestion (or other reason) that caused (or is otherwise associated with) the connection rejection. In other words, a barring condition may be a condition indicating that the connection (or connections) associated with the connection rejection (or rejections) may not be sufficient for providing services to the UE. For example, congestion conditions may be one type of barring conditions. Congestion conditions may result in multiple connection rejections. The UE 106 may detect indications of barring conditions in various ways, as described below. Note that the UE 106 may utilize any number of the following (and/or other) methods of detecting barring conditions, e.g., these methods may be used individually or in any combination.

In some embodiments, the UE 106 may start a new timer beginning with a first connection rejection, e.g., the UE 106 may use a "timer-based" method to detect congestion as a barring condition. The timer may be used to track the total (e.g., cumulative) wait time from connection rejections. The timer may be stopped if the UE either reselects to another cell or successfully accesses a network in response to a connection request. If the timer expires (e.g., before reselection or successful network access), the UE 106 may determine that congestion conditions (e.g., and thus, barring conditions) exist. In other words, the UE 106 may determine that congestion conditions exist if cumulative wait time exceeds a threshold (e.g., based on expiration of the timer). The duration of the timer (e.g., a maximum reject wait timer, e.g., similar to K300) may be configured as desired, e.g., in software of the UE, as a network parameter, etc. For example, the duration of the maximum reject wait timer may be set to 45 seconds. Other durations are possible.

In some embodiments, the UE 106 may track the number of (e.g., consecutive) connection rejections beginning with a first connection rejection. In other words, the UE 106 may use an "attempt-based" method to detect congestion as a barring condition. The UE 106 may compare the number of rejections to a threshold (e.g., a maximum consecutive rejections threshold which may be similar to N300). If the number of connection rejections meets or exceeds the threshold, the UE 106 may determine that congestion (e.g., and thus, barring) conditions exist. The threshold maximum consecutive rejections threshold may be configured as desired, e.g., in software of the UE, as a network parameter, etc. For example, the maximum consecutive rejections threshold may be set to 4 consecutive rejections. Other threshold values are possible. The tracked number of connection rejections may be reset to zero (or otherwise reduced/adjusted) if the UE either reselects to another cell or successfully accesses a network in response to a connection request, at least according to some embodiments.

In some embodiments, the UE 106 may track the frequency at which it receives connection rejections. In other words, the UE 106 may use a "frequency-based" method to detect congestion as a barring condition. If the frequency exceeds a threshold (e.g., more than X connection rejections occur within Y seconds), the UE 106 may determine that congestion (and thus barring) conditions exist. The threshold parameters (e.g., X and Y) may be configured as desired, e.g., in software of the UE, as a network parameter, etc. For example, the threshold may be set to 3 rejections within 30 seconds. Other threshold values are possible. The frequency may or may not be reset if the UE either reselects to another cell or successfully accesses a network in response to a connection request. For example, a UE 106 may track the frequency over extended periods of time (e.g., including one or more successful connection attempts), but may still determine that congestion conditions exist if the frequency of rejections exceeds a threshold. This may allow the UE 106 to detect congestion conditions in the case that it successfully makes connections, but the connections are dropped, e.g., due to an overloaded BS or NW element. This extended tracking may be a means of estimating a probability, e.g., the probability that a next connection request will be rejected. If an estimate of the probability exceeds a threshold, the UE 106 may determine that congestion conditions exist. Alternatively, or additionally, the frequency tracking may be reset (e.g., partially or fully) or otherwise adjusted based on a successful connection (e.g., or reselection). Note that different frequency thresholds may be used, e.g., one threshold may be applied for extended tracking (e.g., including successful connection attempts) and a different threshold may be used for tracking that is reset in the event of a successful connection or reselection.

In some embodiments, a UE 106 may detect congestion conditions based at least in part on other signaling. In other words, a UE 106 may use a "signaling-based" method to detect congestion as a barring condition. For example, a BS 102 may transmit or broadcast a message to a UE 106 (or UEs) to inform the UE 106 that congestion (e.g., and thus barring) conditions exist. The UE 106 may detect congestion conditions based on the message. As another example, UE 106 may additionally or alternatively detect congestion conditions based on monitoring the number or frequency of connection requests sent by other UEs or based on the number or frequency of connection rejections or connection setup messages transmitted by one or more base stations (e.g., including the BS 102). For example, if the UE 106 detects that a ratio of connection rejections to connection setup messages transmitted by the BS 102 (and or one or more neighboring BSs) exceeds a threshold, the UE 106 may determine that congestion conditions exist. Similarly, if the UE 106 detects that the fraction of connection requests that are rejected exceeds a threshold, then congestion conditions may exist. Still further, if the UE 106 detects that the number of connection requests is high (e.g., exceeds a threshold rate of connection requests over a period time), the UE 106 may determine that congestion conditions exist. Other similar metrics may be used additionally or alternatively.

In some embodiments, a UE 106 may detect barring conditions based on user activity, e.g., a "user intervention-based" method to detect barring conditions. For example, if a user activity that requires (e.g., requests) cellular services is initiated while a wait timer (e.g., T302) is running, the UE may determine that barring conditions exist based on the user activity.

In some embodiments, the methods of detecting barring conditions may be based on a single cell. In other embodiments, one or more cells, tracking areas, RATs, and/or networks (e.g., PLMNs) may be considered. For example, the UE 106 may apply the timers or frequency tracking techniques to connection attempts to any number of BSs (e.g., BS 102*a*-102*n*) and any number of cells which may provide access to any number of networks via any combination of RATs. In some embodiments, the UE may consider any number of connections and any number of connection rejections (e.g., received on any combination of connections) to detect barring conditions.

In some embodiments, the UE may determine and/or record various factors associated with a detection of barring conditions. Such factors may include time, network/radio conditions, location, etc.

The UE 106 may implement barring based at least in part on detecting barring conditions (608) (e.g., at least one barring condition), according to some embodiments. To implement barring, the UE may (e.g., at least temporarily) avoid use (e.g., initiating further connection requests) of one or more connections. For example, the UE may avoid the use of a connection (or connections) associated with the connection request(s) and/or connection rejection(s). Thus, the UE 106 may attempt to access services using a different (e.g., not barred) connection or connections. The UE 106 may implement barring according to one or more barring parameters, as described below.

In some embodiments, the barring parameters may include which connection(s) to bar. In other words, barring may be implemented for a single cell, multiple cells, one or more tracking areas, one or more RATs, and/or one or more networks (e.g., PLMNs, or any combination of those connections. The connection(s) to be barred may be selected in various ways.

As a first possibility, the UE 106 may bar connections with a current serving cell (e.g., for which congestion conditions have been detected). Barring such a serving cell may allow the UE 106 to avoid use of the serving cell and/or reselect to a different cell, e.g., even though the UE 106 may have good channel conditions with the current serving cell and even though the UE 106 may not be moving (e.g., in a manner that would otherwise trigger cell reselection). In other words, by barring the (e.g., congested) serving cell, the UE 106 may be able to establish a connection (e.g., a second connection) with a different (e.g., less congested) cell, notwithstanding conditions that would otherwise not trigger such reselection. By attempting to access services via a different cell, the UE 106 may be able to bypass the congestion or other reason that the serving cell rejected the connection request. The different cell (or cells) that the UE 106 reselects to may or may not be in the same NW or tracking area as the serving cell, and may or may not use the same RAT(s). The second connection may be established through one or more procedures such as cell selection, cell reselection, RAT selection (e.g., reselection), or PLMN selection (e.g., reselection), among various possibilities. The different cell may be part of the same PLMN or tracking area as the current serving cell, or may be part of a different PLMN or tracking area. Further, the different cell may use the same or a different RAT as the current serving cell.

As a second possibility, the UE 106 may bar all connections using a congested RAT (e.g., associated with congestion conditions, e.g., a current RAT). For example, it may be the case that some PLMNs may be congested at NW elements associated with a higher priority RAT (e.g., LTE), but have capacity for additional users on lower priority RATs (e.g., UMTS). Accordingly, it may be advantageous for a UE 106 that detects congestion on one or more cells of the higher priority RAT to bar the higher priority RAT and attempt to access service on a lower priority RAT.

As a third possibility, the UE 106 may (e.g., iteratively) bar connections according to a priority order. For example, the priority order may be: cell, then tracking area, then RAT, then PLMN. In other words, to apply this exemplary priority order, the UE 106 may first bar a cell for which it has detected congestion. The UE 106 may then attempt to access another cell or cells nearby (e.g., neighbor cells that are in communicative range, e.g., by sending one or more connection requests as in block 602). If the UE 106, is unable to access NW services via the one or more other cells (e.g., due to receiving one or more connection rejections and/or detecting congestion as in blocks 604 and 606 and/or due to other reasons), the UE 106 may then bar all cells in that tracking area. The UE 106 may then attempt to access cells in other tracking areas. If unsuccessful, the UE 106 may bar the RAT (e.g., a first RAT or RATs) associated with the congested cell(s), and may proceed to attempt to access cells or networks of one or more other (e.g., second) RATs. For example, if the UE 106 has attempted to access one or more LTE cells, it may attempt to access a different RAT, e.g., UMTS, and/or it may attempt to access non-cellular networks, e.g., via WLAN. Finally, if the UE 106 is still unsuccessful on the second RAT(s) and/or non-cellular networks, the UE 106 may bar one or more networks (e.g., PLMNs) and attempt to access network services over a different network. Barring a PLMN may be particularly useful in roaming scenarios, among various possibilities. In other words, the UE 106 may iteratively apply the process of requesting access, receiving rejections, detecting barring conditions, and barring a next connection (or connection type) from the priority order. It should be noted that the example priority order is exemplary only and that other orders may be used, including priority orders that specify different connections, additional/alternative connections, or fewer connections. The priority order may be configured by the network (e.g., by RRC configuration) and/or may be preconfigured (e.g., by design of the UE, by a user setting, etc.). Moreover, the priority order may be determined dynamically, e.g., based on measurements of radio link conditions, movement of the UE 106, information broadcast by one or more networks, information included in a connection rejection message, etc. Further, although the example provided was discussed in terms of a first cellular connection type, other first connection types are possible. For example, a UE 106 may first attempt to access one or more WLANs, determine that the one or more WLANs are congested (e.g., as in 606), and then proceed (e.g., according to a priority order) to attempt to access one or more cellular networks.

As a fourth possibility, the connection barring parameters may include what connection to bar in the case of radio access network (RAN) sharing (e.g., one cell may support multiple PLMNs). For example, the home (e.g., registered) PLMN may be barred if congestion is detected on a RAN-sharing cell. Alternatively, all PLMNs may be barred on the RAN-sharing cell.

In some embodiments, the barring parameters may include a validity period (K), e.g., the amount of time for which barring may be implemented. The validity period may be configured as desired, e.g., it may be configured by the NW, specified in a technical standard, configured in software of the UE, etc. If a validity period is not defined, the UE 106 may autonomously determine a validity period to use. The validity period may be any duration. For example, the validity period (K) may be 5 minutes, among various possibilities. The duration of the validity period may be based in part on one or more of various factors, including but not limited to: other barring parameters, the method or methods used to detect barring conditions, previous barring implementations and the success of those previous implementations, radio link measurements, applications executing on the UE 106, battery level of the UE 106, motion of the UE 106, etc. The validity period may be randomized (e.g., as described with respect to 506, above).

During the validity period, the UE 106 may attempt to access services via one or more other (e.g., not barred) connections, e.g., a second connection that is different than the barred connection(s). For example, if the UE 106 has barred a connection with a current serving cell, the UE 106 may attempt to access services (e.g., reselect to) another cell, e.g., a neighbor cell. Similarly, if the UE 106 has barred a first RAT, e.g., LTE, the UE 106 may attempt to connect using a different RAT (e.g., UMTS). Cell selection, cell reselection, or PLMN selection procedures may be used to identify and establish the second connection, among various possibilities.

In some embodiments, the UE 106 may track the success of the barring parameters, and may adapt them over time. For example, the UE 106 may determine that at some times and/or locations, barring a RAT may frequently be successful, while at other times and/or locations barring a cell may frequently be successful. The UE 106 may record such data, attempt to determine any patterns, and select barring parameters accordingly.

FIG. 7 is a flowchart diagram illustrating another possible embodiment of a scheme to enhance handling of connection rejections. According to some embodiments, use of the scheme depicted in FIG. 7 may result in improvements to network deployment and thus, in the long term, improvements the user experience and reduced susceptibility to DOS attacks, among other potential benefits. Aspects of the method of FIG. 7 may be implemented by a wireless device such as a UE 106 in communication with a BS 102 illustrated in various of the Figures herein, or more generally in conjunction with any of the computer systems or devices shown in the above Figures, among other devices, as desired. For example, one or more processors such as 302, a processor included in circuitry 330, 404, etc. may cause a UE 106 and/or BS 102 to implement any or all of the method elements of FIG. 7.

In various embodiments, some of the elements of the method shown may be performed concurrently, in a different order than shown, may be substituted for by other method elements, or may be omitted. Additional elements may also be performed as desired. As shown, the method may operate as follows.

The wireless device (e.g., UE 106) may send a connection request to a BS, e.g., BS 102 (702), and the network (e.g., via a BS 102) may send a connection rejection message to the UE 106 (704), e.g., similar to blocks 502 and 504 of FIG. 5. Thus, blocks 702 and 704 of FIG. 7 may include similar features and functionality as previously described herein with respect to blocks 502 and 504 of FIG. 5, at least according to some embodiments. Further, the wireless device may detect a barring condition, e.g., similar to block 606 of FIG. 6. Thus, block 706 of FIG. 7 may include similar features and functionality as previously described herein with respect to block 606 of FIG. 6, at least according to some embodiments.

The UE 106 may report the detected barring/congestion conditions to a network (e.g., PLMN) (708). The report may be provided at any time that the UE 106 has access to communicate such a report to the network. The report may include any details about the barring conditions and/or connection rejection(s) such as: when and where congestion was detected, how congestion was detected, barring parameters implemented by the UE 106, whether/how the barring parameters led to successful access, radio link conditions, etc. For example, the report may include a list of barred cells, among various possibilities. For example, the report may identify a current serving cell. Such reports may be useful to the network operator to adjust deployment of resources and/or network policies/parameters. In some embodiments, such reports may be used by elements of the network to adjust various parameters dynamically. For example, a network may route some traffic away from a congested network element, and instead direct the traffic to a different network element with available capacity. Similarly, a network may send instructions to one or more UEs to offload traffic from a congested RAT to a less congested RAT. Still further, a network may use such reports to dynamically adjust pricing or availability of one or more services. It should be noted that such reports may be provided anonymously, in at least some embodiments.

It should be noted that aspects of the methods FIGS. 5-7 may be combined in various ways. For example, the features and functionality described with respect to two or more of blocks 506, 608, and 708 may operate together, e.g., sequentially or concurrently, among various possibilities. All such combinations should be considered in the scope of the present application.

FIGS. 8-11—Exemplary Communication Flows of Connection Rejections

FIGS. 8-11 illustrate various possible embodiments of the methods of FIGS. 5-7. FIGS. 8-11 illustrate various possible communication flow sequences between a UE and a network, e.g., NW 100. It should be noted that these illustrated sequences are exemplary only, and that other sequences are possible, according to some embodiments.

Figure 8:
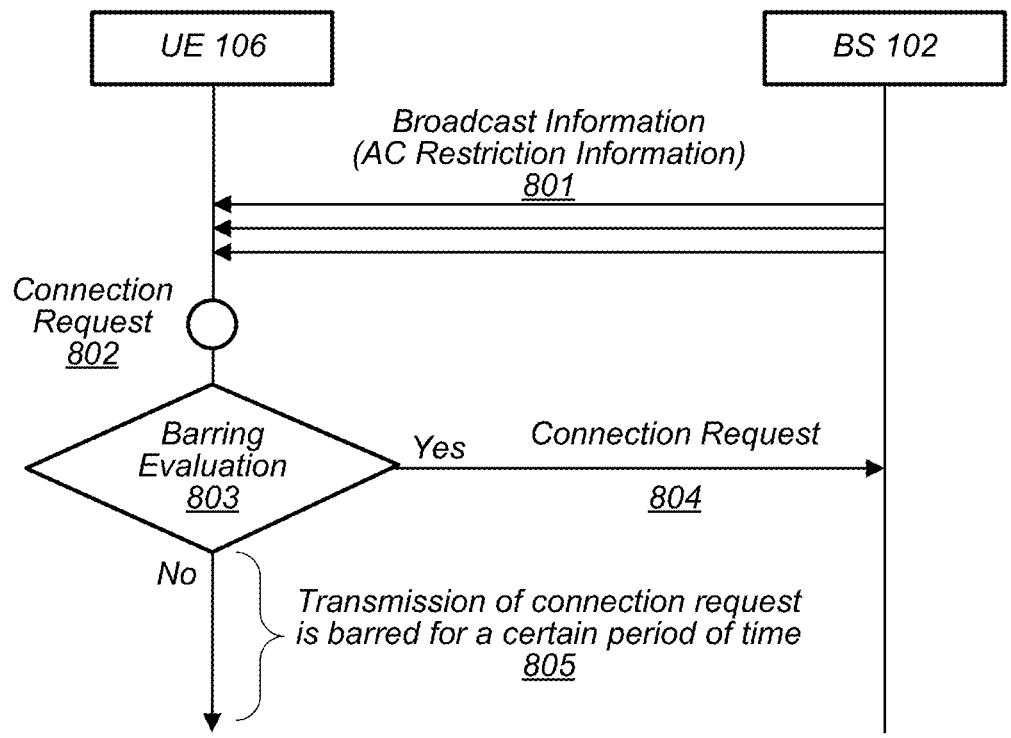
FIGS. 8-11 are communication flow diagrams illustrating possible sequences of connection requests, according to one embodiments.

FIG. 8 is communication flow diagram illustrating one possible sequence of communications between a UE 106 and BS 102, according to some embodiments. In the illustrated example, barring may be implemented with an access class (AC) control method.

The BS 102 may broadcast AC restriction information (801) and the UE 106 may receive the AC restriction information. The AC restriction information may be broadcast in a SIB1 and may define access baring parameters, including allowed access classes, barring times, etc. The AC restriction information may be broadcast any number of times, e.g., three times in the illustrated example.

The UE 106 may determine to consider a connection request (802). For example, the UE 106 may determine to consider transmitting a connection to BS 102 and/or to another network.

The UE 106 may perform a barring evaluation (803) to determine whether or not to send the connection request. The UE 106 may consider the services to be requested and the AC restriction information. Based on the determination, the UE may send the connection request (804, "Yes"), or may bar the connection request and wait for a period of time (805, "No").

Figure 9:
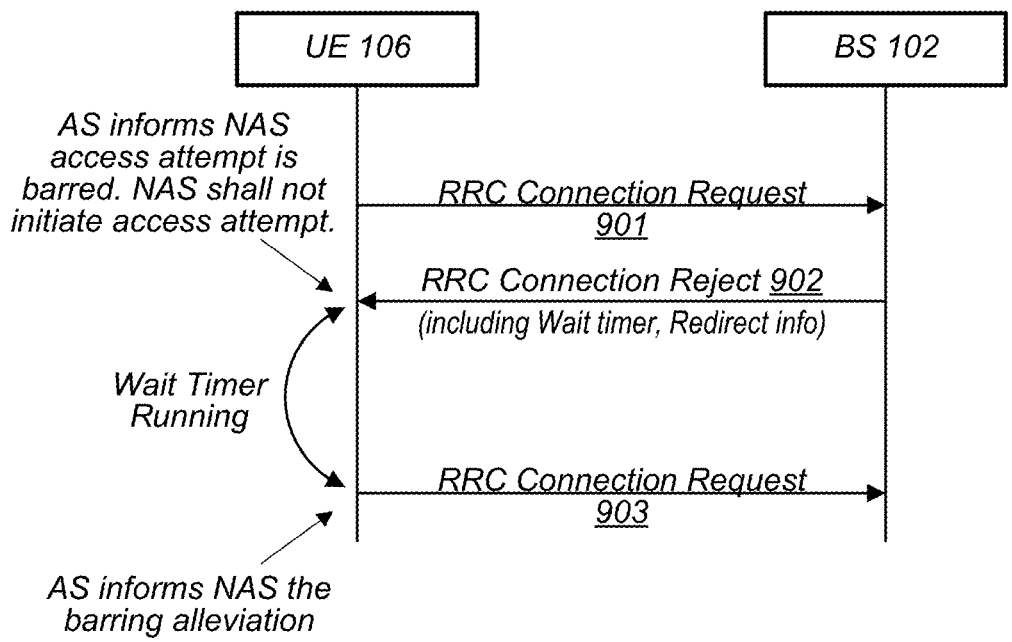

FIG. 9 is communication flow diagram illustrating another possible sequence of communications between a UE 106 and BS 102, according to some embodiments. In the illustrated example, barring may be implemented with a connection rejection method.

The UE 106 may transmit a connection request (e.g., an RRC connection request) to a BS 102 (901). The UE may start a first timer (e.g., T300). The connection request may include AC and/or other information.

In response to the connection request, the BS 102 may send a connection rejection (e.g., RRC connection reject) to the UE 106 (902). The connection rejection may be based on the AC, level of congestion on the network/BS, and/or other factors. The rejection message may specify a duration of a wait timer, redirection information, or other parameters. In response to the connection rejection, the UE 106 may stop the first timer and start a second timer (e.g., T302). The AS layer (e.g., of the UE 106) may inform the NAS layer that the access attempt is barred, so that the NAS layer (e.g., of the UE 106) will not initiate an access attempt while the second timer is running.

In response to expiration of the second timer, the UE 106 may send a second connection request (903). The AS layer may inform the NAS that the barring is alleviated.

Figure 10:
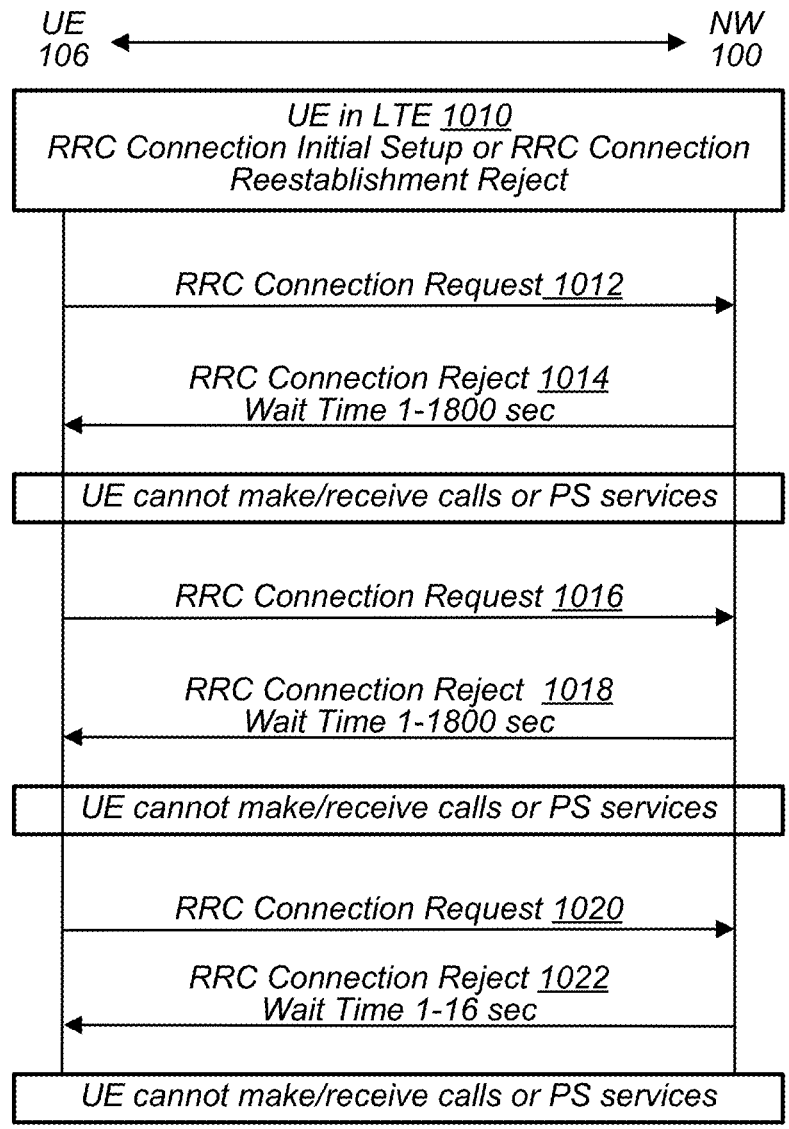

FIG. 10 is communication flow diagram illustrating another possible sequence of communications between a UE 106 and NW 100, according to some embodiments. In the illustrated example, barring may be implemented with a connection rejection method.

A UE 106 may be in the process of setting up a connection (1010) (e.g., an RRC connection over LTE). The UE may perform initial setup or may seek to reestablish a prior connection. The UE may send a first connection request (1012) and may receive a first connection rejection (1014). Based on the connection rejection, the UE 106 may wait for a period of time (e.g., 1-1,800 seconds, in the illustrated example, other durations are possible). During the waiting period, the UE 106 may not be connected and may not be able to access services (e.g., make/receive calls or use packet-switched or circuit-switched services, etc.). Following the waiting period, the UE 106 may send a second connection request (1016) and again receive a rejection (1018). The UE may again wait, and thus may remain unable to access services. The process may repeat with connection request 1020 and rejection 1022. The process may repeat any number of times, and may thus result in a poor user experience.

Figure 11:
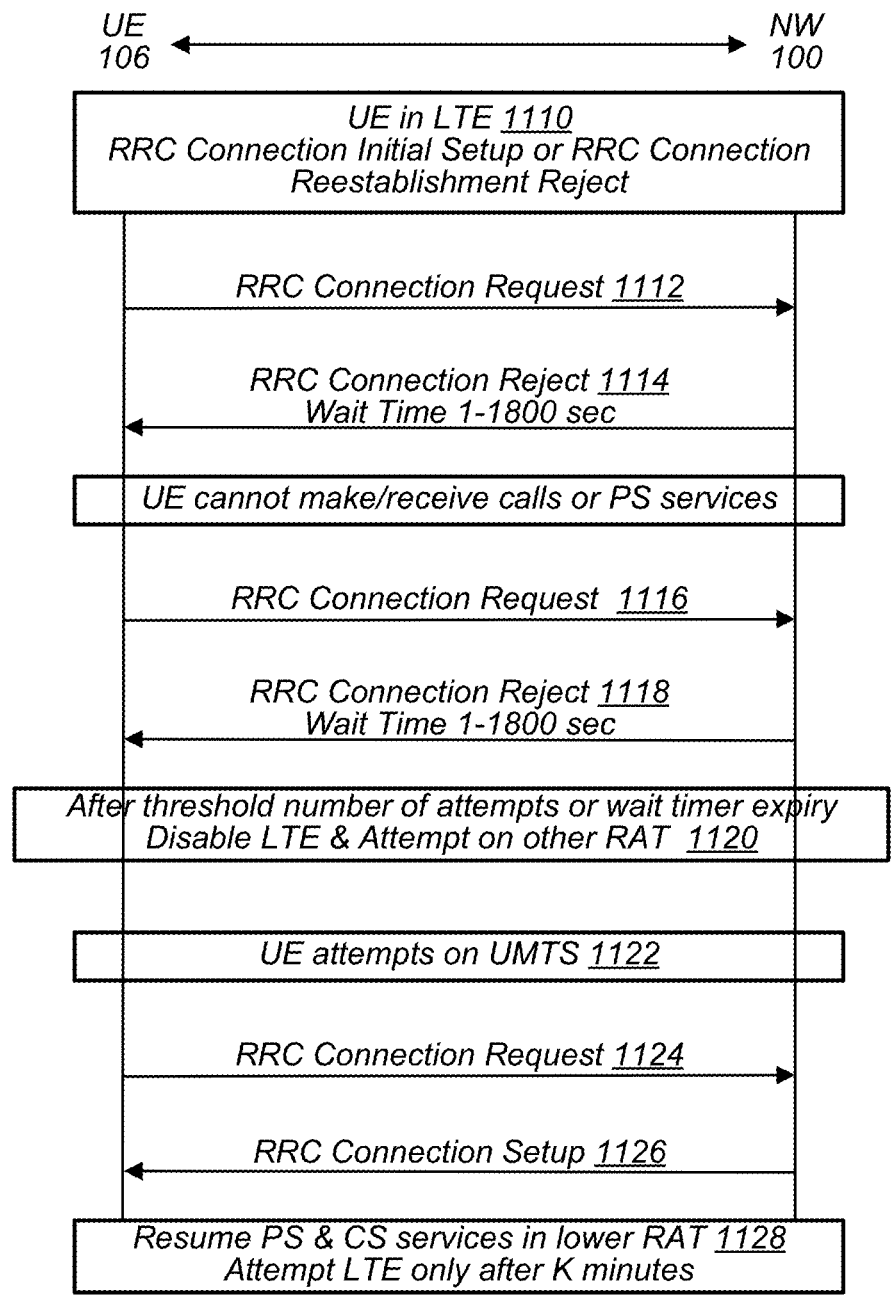

FIG. 11 is communication flow diagram illustrating another possible sequence of communications between a UE 106 and NW 100, according to some embodiments. In the illustrated example, barring may be implemented with a connection rejection method. FIG. 11 is similar to FIG. 10, however as illustrated in FIG. 11, the UE 106 may use the techniques of FIG. 6 to achieve a connection.

The wireless device (e.g., UE 106) may set up a connection (1110), send a first connection request (1112), receive a first rejection (1114), wait for a period time (e.g., during which the UE may not make/receive calls or PS services), send a second connection request (1116), and receive a second rejection (1118). Blocks 1110-1118 of FIG. 11 may include similar features and functionality as previously described herein with respect to blocks 1010-1018 of FIG. 10, at least according to some embodiments.

The UE 106 may detect barring conditions and implement barring (1120). The UE 106 may detect barring conditions based on any of the method(s) as described above. For instance, barring conditions may be detected based on a number (e.g., a maximum consecutive rejections threshold) of unsuccessful attempts or after a certain amount of cumulative wait time (e.g., based on a maximum reject wait timer). Based on detecting the barring conditions, the UE 106 may determine to implement barring, e.g., according to any desired barring parameters. In the illustrated example, the UE 106 bars a first RAT (e.g., LTE).

The UE 106 may attempt to gain access to a network using a second connection that is not barred (1122). For example, the second connection may be associated with a non-barred network, RAT, cell, etc. In the illustrated example, the UE 106 may make an attempt via an alternative RAT, e.g., UMTS. The UE 106 may send a connection request over the second connection (1124). The NW 100 may have sufficient capacity (e.g., congestion may be sufficiently low), and may thus grant the connection request by sending a connection setup message (1126).

The UE 106 may access (e.g., resume) packet-switched and/or circuit-switched services using the second connection (1128). The UE 106 may further make another attempt to access services via the first connection after expiration of the validity period of the barring (e.g., after K minutes).

Figure 12:
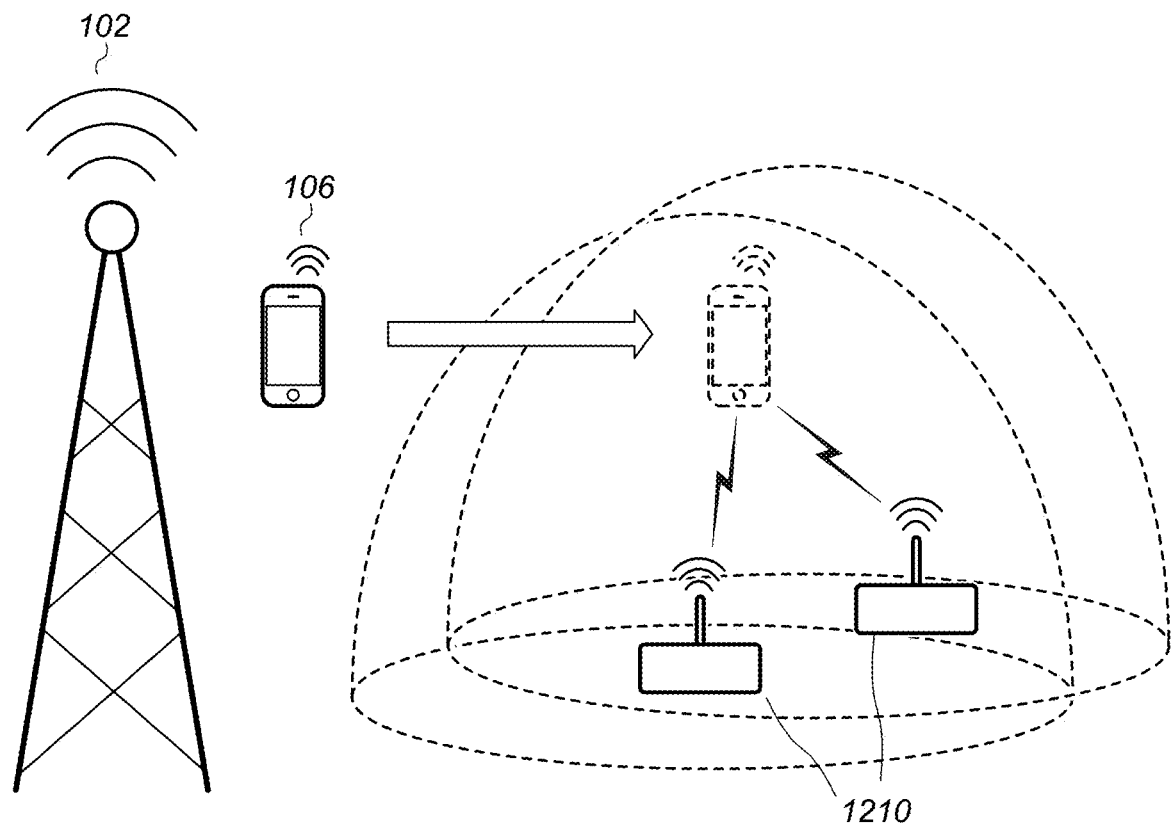
FIG. 12 illustrates a potential denial of service attack based on connection rejection, according to some embodiments.

FIG. 12—Denial of Service (DOS) Attack

FIG. 12 illustrates an exemplary DOS attack that may be carried out by a malicious/fake base station. As shown, UE 106 may be in the coverage area of a (e.g., real, legitimate) BS 102. The UE 106 may transmit a connection request to the BS 102. One or more malicious/fake base stations (1210) may transmit one or more fake connection rejections to the UE 106. The fake connection rejection(s) may include a long waiting time(s). Thus, the UE 106 may wait for an extended period of time without accessing network services based on the fake connection rejection(s), and thus may be a victim of the DOS attack. However, a UE 106 implementing the techniques disclosed herein may avoid some of the consequences of the DOS attack by barring the cell (or RAT, PLMN, etc.) of the BS 102, and reselecting to a different cell (or RAT, PLMN, etc.), according to some embodiments. Moreover, a UE 106 implementing the techniques herein may provide information to the NW operator that is useful for detecting the DOS attack, e.g., by reporting the apparent congestion conditions detected by the UE 106 based on the fake connection rejections. For example, the NW operator may compare the actual level of congestion (e.g., at the time of the reported congestion) to the reported level of congestion (e.g., or reported existence of barring conditions based on congestion) and detect the DOS attack. The UE 106 may record and report any or all details of the connection rejection in order to provide useful data to the network operator for identifying and remedying such attacks.

Other Information and Additional Embodiments

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

In the following, exemplary embodiments are described.

In a first set of embodiments, a user equipment device (UE) may comprise: a radio; and a processing element coupled to the radio; wherein the UE is configured to: transmit a connection request to a base station; receive a connection rejection from the base station, wherein the connection rejection is in response to the connection request; and bar at least one connection in response to the connection rejection, wherein the at least one connection is barred for a duration of a validity period, wherein the UE is configured to not transmit any connection requests to the base station using the at least one connection during the duration of the validity period.

In some embodiments, the duration of the validity period may be randomized.

In some embodiments, the UE may be further configured to detect barring conditions, wherein said detecting is based at least in part on an activity of a user of the UE.

In a second set of embodiments, an apparatus for controlling a user equipment device (UE), the apparatus may comprise a processing element, wherein the processing element may be configured to cause the UE to: transmit at least one connection request; receive at least one connection rejection in response to the at least one connection request; detect at least one barring condition; implement barring, based at least in part on the at least one barring condition, wherein to implement barring the apparatus is configured to avoid use of a first connection, wherein the first connection is associated with the at least one connection rejection; and attempt to access services via a second connection.

In some embodiments, the processing element may be further configured to cause the UE to: transmit a report to a network, wherein the report comprises information about the at least one barring condition.

In some embodiments, said implementing barring may comprise barring a current serving cell.

In some embodiments, said implementing barring comprises barring a radio access technology.

In some embodiments, said implementing barring may comprises barring a tracking area.

In some embodiments, said implementing barring comprises barring a first public land mobile network (PLMN).

In some embodiments, the at least one connection rejection may be received from a radio access network (RAN) sharing cell that supports a plurality of PLMNs, wherein the first PLMN is one of the plurality of PLMNs, wherein the first PLMN is a home PLMN of the UE, wherein the first connection comprises a connection with the first PLMN.

In some embodiments, each PLMN of the plurality of PLMNs is barred, wherein the first connection comprises a connection with any PLMN of the plurality of PLMNs.

In some embodiments, said implementing barring comprises iteratively barring a plurality of connections based on a barring priority order.

In some embodiments, said attempting to access services via the second connection comprises one or more of the following procedures: cell selection; cell reselection; and public land mobile network (PLMN) selection.

In a third set of embodiments, a method for a wireless user equipment (UE) device, may comprise: transmitting at least one connection request; receiving at least one connection rejection in response to the at least one connection request; and implementing barring based at least in part on the at least one connection rejection, wherein implementing barring comprises: avoiding the use of a first connection, wherein the first connection is associated with the at least one connection rejection; and attempting to access a second connection.

In some embodiments, the first connection may comprise a connection with a first cell, wherein attempting to access the second connection comprises reselecting to a second cell.

In some embodiments, the method may further comprise: starting a timer, wherein the timer is started when a first connection rejection of the at least one connection rejection is received; and based on expiration of the timer, determining that a cumulative wait time exceeds a threshold, wherein said implementing barring based at least in part on the at least one connection rejection is in response to determining that the cumulative wait time exceeds the threshold.

In some embodiments, the method may further comprise: tracking a number of connection rejections; and determining that the number of connection rejections exceeds a threshold, wherein said implementing barring based at least in part on the at least one connection rejection is in response to determining that the number of connection rejections exceeds the threshold.

In some embodiments, the method may further comprise: determining that a number of connection rejections received during a period of time exceeds a threshold, wherein said implementing barring based at least in part on the at least one connection rejection is in response to determining that the number of connection rejections during the period of time exceeds the threshold.

In some embodiments, said detecting barring conditions may be based on an estimate of a probability that a next connection request will be rejected.

In some embodiments, said detecting barring conditions is based at least in part on a user activity.

In some embodiments, the first connection comprises a connection using a first radio access technology (RAT), wherein the second connection comprises a connection using a second RAT, wherein attempting to access the second connection comprises transmitting at least a second connection request using the second RAT.

In some embodiments, the first connection comprises a connection using a first public land mobile network (PLMN), wherein the second connection comprises a connection using a second PLMN.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. An apparatus, comprising:
a processor configured to cause a user equipment device (UE) to:
  determine to provide a first service;
  transmit at least one radio resource control (RRC) connection request, wherein the at least one RRC connection request is associated with the first service;
  receive a number of RRC connection rejections in response to the at least one RRC connection request;
  determine that the number of RRC connection rejections exceeds a threshold;
  determine that at least one barring condition exists in response to the determination that the number of RRC connection rejections exceeds the threshold; and iteratively implement barring according to a barring priority order, based at least in part on the at least one barring condition, wherein to iteratively implement barring includes:
avoiding use of a first cellular connection, wherein the first cellular connection is associated with the number of RRC connection rejections;
attempting to provide the first service via a second connection according to the barring priority order;
determining to bar the second connection; and
attempting to provide the first service via a third connection according to the barring priority order.

2. The apparatus of claim 1, wherein the processor is further configured to cause the UE to:
transmit a report to a cellular network, wherein the report comprises information about the at least one barring condition and identification of a current serving cell.

3. The apparatus of claim 1, wherein the processor is further configured to cause the UE to:
determine a barring parameter in response to detecting the at least one barring condition, wherein to implement barring comprises implementing barring according to the barring parameter.

4. The apparatus of claim 3,
wherein said implementing barring according to the barring parameter comprises barring a cellular radio access technology.

5. The apparatus of claim 3,
wherein said implementing barring according to the barring parameter comprises barring one of a tracking area or a current serving cell.

6. The apparatus of claim 3,
wherein said implementing barring according to the barring parameter comprises barring a first public land mobile network (PLMN).

7. The apparatus of claim 6, wherein the number of RRC connection rejections is received from a radio access network (RAN) sharing cell that supports a plurality of PLMNs, wherein the first PLMN is one of the plurality of PLMNs, wherein the first PLMN is a home PLMN of the UE, wherein the first cellular connection comprises a cellular connection with the first PLMN.

8. The apparatus of claim 7, wherein each PLMN of the plurality of PLMNs is barred, wherein the first cellular connection comprises a cellular connection with any PLMN of the plurality of PLMNs.

9. The apparatus of claim 1,
wherein said attempting to provide the first service via the second connection comprises one or more of the following procedures:
cell selection;
cell reselection; or
RAT selection; or
public land mobile network (PLMN) selection.

10. The apparatus of claim 1, wherein the barring priority order comprises: cell, then tracking area, then radio access technology (RAT), and then public land mobile network (PLMN).

11. A user equipment device (UE) comprising:
a radio; and
a processor coupled to the radio;
wherein the UE is configured to:
transmit a first connection request to a cellular base station;
receive a cellular connection rejection rejecting access to a cellular network from the cellular base station in response to the first connection request;
initiate a timer in response to the cellular connection rejection;
determine that a user activity requiring cellular service is initiated while the timer is running; and
bar at least a first cellular connection in response to the determination, wherein the first cellular connection is barred for a duration of a validity period, wherein the UE is configured to not transmit any connection requests to the cellular base station using the first cellular connection during the duration of the validity period, wherein to bar at least the first cellular connection comprises performing iterative barring according to a barring priority order.

12. The UE of claim 11, wherein the duration of the validity period is randomized.

13. The UE of claim 11, wherein the first connection comprises a connection using a first public land mobile network (PLMN), wherein the UE is further configured to transmit a second connection request associated with a second PLMN.

14. The UE of claim 11, wherein to bar at least the first cellular connection comprises barring a cellular radio access technology.

15. The UE of claim 11, wherein the barring priority order comprises: cell, then tracking area, then radio access technology (RAT), and then public land mobile network (PLMN).

16. A method, comprising:
at a user equipment device (UE):
transmitting a first connection request to a cellular base station;
receiving a cellular connection rejection rejecting access to a cellular network from the cellular base station in response to the first connection request;
initiating a timer in response to the cellular connection rejection;
determining that a user activity requiring cellular service is initiated while the timer is running; and
barring at least a first cellular connection in response to the determination, wherein the first cellular connection is barred for a duration of a validity period, wherein the UE is configured to not transmit any connection requests to the cellular base station using the first cellular connection during the duration of the validity period, wherein said barring at least the first cellular connection comprises performing iterative barring according to a barring priority order.

17. The method of claim 16, wherein the duration of the validity period is randomized.

18. The method of claim 16, wherein the first connection comprises a connection using a first public land mobile network (PLMN), wherein the UE is further configured to transmit a second connection request associated with a second PLMN.

19. The method of claim 16, wherein said barring at least the first cellular connection comprises barring a cellular radio access technology.

20. The method of claim 16, wherein the barring priority order comprises: cell, then tracking area, then radio access technology (RAT), and then public land mobile network (PLMN).

* * * * *